US006870475B2

(12) United States Patent
Fitch et al.

(10) Patent No.: US 6,870,475 B2

(45) Date of Patent: Mar. 22, 2005

(54) ELECTRICALLY ISOLATED POWER AND DATA COUPLING SYSTEM SUITABLE FOR PORTABLE AND OTHER EQUIPMENT

(75) Inventors: John Kenneth Fitch, Newton, MA (US); Clifford Mark Kelly, Windham, NH (US)

(73) Assignee: Draeger Medical Systems Inc., Danvers, MA (US)

(*) Notice: Subject to any disclaimer, the term of this patent is extended or adjusted under 35 U.S.C. 154(b) by 218 days.

(21) Appl. No.: 10/279,958

(22) Filed: Oct. 24, 2002

(65) Prior Publication Data

US 2004/0004460 A1 Jan. 8, 2004

Related U.S. Application Data

(60) Provisional application No. 60/394,393, filed on Jul. 8, 2002.

(51) Int. Cl.[7] .................................................. G08B 1/08

(52) U.S. Cl. .................. 340/539.12; 307/104; 320/108; 600/300

(58) Field of Search .............................. 340/573.1, 531, 340/539.1, 539.11, 539.12, 333, 693.1, 310.01, 310.06, 310.07; 307/104; 600/300; 128/903; 320/108, 114, 115

(56) References Cited

U.S. PATENT DOCUMENTS

| | | | | |
|---|---|---|---|---|
| 3,690,313 A | | 9/1972 | Weppner et al. | 600/508 |
| 4,338,951 A | | 7/1982 | Saliga | 600/300 |
| 4,461,302 A | | 7/1984 | Phillipps et al. | 600/305 |
| 5,229,652 A | * | 7/1993 | Hough | 307/104 |

(List continued on next page.)

FOREIGN PATENT DOCUMENTS

| | | |
|---|---|---|
| DE | 10009591 A1 | 9/2001 |
| FR | 2601161 | 7/1986 |
| GB | 2262634 A | 6/1993 |
| GB | 2330461 A | 4/1999 |
| WO | 02/41773 A1 | 5/2002 |

OTHER PUBLICATIONS

MOTOROLA Digital dna http://e–www.motorola.com/brdata/PDFDB/docs/SG2042.pdf Four–fold growth move for Planar Magnetics http://www.planarmagnetics.com/news1.html.

ENERPRO Electric Vehicle Battery Charger http://www.enerpro–inc.com/pdfs/evbc.pdf.

*Primary Examiner*—Thomas Mullen

(74) *Attorney, Agent, or Firm*—Jack Schwartz & Associates

(57) ABSTRACT

An electrically isolated combined power and signal coupler is usable for a portable medical monitoring device attachable to a patient in a medical environment. A power coupling system transfers power between a power source and a powered device separated by a physical and electrical isolation barrier. The system comprises a power coupler including in a first device, a first section of a magnetic circuit including a first core section of magnetically permeable material of cross-sectional area substantially larger at an isolation barrier interface than within a first winding located on the first core section. The first section of magnetic circuit being suitable, in a docking mode, for positioning adjacent to a second section of magnetic circuit in a second device to form a completed magnetic circuit used to transfer power between said first and second device. The second section of magnetic circuit including a second core section with a second winding magnetically coupling with the first winding via the completed magnetic circuit in the docking mode for the power transfer. The first core section comprises at least one substantially planar core section at the isolation barrier interface for positioning adjacent to a corresponding substantially planar core section of said second section of magnetic circuit at the isolation barrier interface to form the completed magnetic circuit without a device containing the second section of magnetic circuit enveloping a significant portion of the substantially planar core section.

13 Claims, 5 Drawing Sheets

U.S. PATENT DOCUMENTS 5,284,151 A * 2/1994 Onoda ........................ 600/523
5,301,096 A 4/1994 Klontz et al. ................. 363/37
5,341,280 A 8/1994 Divan et al. .................. 363/37
5,353,001 A 10/1994 Meinel et al. ................ 336/83
5,379,021 A 1/1995 Ito et al. ....................... 336/83
5,422,519 A 6/1995 Russell ....................... 307/104
5,455,466 A 10/1995 Parks et al. ................. 307/104
5,455,467 A 10/1995 Young et al. ............... 307/104
5,506,560 A 4/1996 Takeuchi et al. .............. 336/83
5,536,979 A 7/1996 McEachern et al. ........ 307/104
5,543,773 A 8/1996 Evans et al. ................ 336/183
5,635,814 A 6/1997 Afzal et al. ................. 320/111
5,664,228 A 9/1997 Mital ......................... 395/882
5,734,254 A 3/1998 Stephens .................... 320/106
5,814,900 A 9/1998 Esser et al. ................. 307/104
5,865,733 A 2/1999 Malinouskas et al. ...... 600/300
5,878,282 A 3/1999 Mital .......................... 710/62
5,923,757 A 7/1999 Hocker et al. ................ 380/21
5,930,368 A 7/1999 Hocker et al. ................ 380/52
5,936,539 A * 8/1999 Fuchs ......................... 128/903
5,949,213 A 9/1999 Lanni ......................... 320/106
6,057,668 A 5/2000 Chao .......................... 320/108
6,067,076 A 5/2000 Hocker et al. .............. 345/158
6,072,468 A 6/2000 Hocker et al. .............. 345/157
6,075,433 A 6/2000 Ono et al. .................. 336/212
6,084,499 A 7/2000 Faulk ......................... 336/178
6,172,884 B1 1/2001 Lanni ...................... 363/21.05
6,221,012 B1 * 4/2001 Maschke et al. ............ 600/301
6,331,744 B1 12/2001 Chen et al. ................. 310/171
6,459,882 B1 10/2002 Palermo et al. ............... 455/41
6,659,947 B1 * 12/2003 Carter et al. ................ 600/300
2001/0045785 A1 11/2001 Chen et al. ................. 307/104
2002/0084698 A1 7/2002 Kelly et al. ................. 307/104
2003/0030530 A1 * 2/2003 Reinhard et al. ........... 336/182

* cited by examiner

Fig. 4 - System

ELECTRICALLY ISOLATED POWER AND DATA COUPLING SYSTEM SUITABLE FOR PORTABLE AND OTHER EQUIPMENT

This is a non-provisional application of provisional application Ser. No. 60/394,393 by J. K. Fitch et al. filed Jul. 8, 2002.

FIELD OF THE INVENTION

The present invention relates to a power and signal coupler for a portable medical monitoring device designed to be connected to a patient in a medical environment.

BACKGROUND OF THE INVENTION

Electrical transformers use inductive coupling of windings, in combination with a core of magnetic material, to transfer power from one circuit to another while maintaining galvanic isolation between the two circuits, in addition to increasing or decreasing output AC voltage levels. The galvanic isolation is needed to power devices that come into contact with people to provide safety and avoid electrocution. Typical transformers use insulating materials such as winding insulation or plastic bobbins between the windings and core to prevent them from touching and maintain galvanic isolation. In some commercial devices, particularly medical equipment, the danger of electrocution of patient or medical staff is so great that additional steps are taken to ensure galvanic isolation and prevent electrical breakdown even in the presence of large voltages as high as 5 kV that may appear, for example, in defibrillators. Typically an isolation barrier of nonconductive material is inserted in the middle of the transformer. Input and output windings are positioned on opposite sides of the barrier and a possibly undesired, but unavoidable air gap is incorporated in the magnetic core and thus the path of the magnetic flux. This barrier technique allows a transformer to be constructed as two separable halves so power source and the powered circuit may be conveniently separated and mated back together again. This technique has been used in rechargeable patient monitoring equipment, and in rechargeable toothbrushes and shavers where an alternative technique, such as the use of exposed electrical contacts, is particularly undesirable because of the moist environment causing corrosion, shorting and increased shock hazard.

In traditional transformer design, the magnetically permeable core containing the magnetic flux, is designed to have an approximately equal cross section (taken perpendicular to the direction of the magnetic flux) throughout the core length to make the most efficient use of the core material. In addition, an air gap is sometimes used to increase the magnetic reluctance in order to allow a higher level of ampereturns in the windings before core saturation occurs, to reduce core losses, or to linearize the B-H curves for the transformer for use in applications such as filters where distortion is of concern, for example. Known barrier technique transformers continued the traditional practice of utilizing cores of approximately constant cross section although this is not the optimum design where the magnetic circuit includes a large air gap.

Known barrier technique transformer devices are typically relatively inefficient, well below the 80% level achievable in conventional DC-DC converters. This wastes power and creates excess heat. Wasted power is important in power constrained applications such as a standard computer port or interface such as USB (Universal Synchronous Bus), for example. In addition, the power density of known barrier technique transformer devices is typically relatively low, restricting its use to low power devices such as toothbrushes and shavers (where recharging power may be 1 to 3 watts, for example), or alternatively such devices involve relatively large and heavy transformer magnetic components. These disadvantages result from poor coupling between input and output windings.

Transformer based power coupling with barrier isolation is used in many portable device type applications including in portable patient monitoring systems. Such portable patient monitoring systems also involve maintaining a data link between the monitoring equipment and a central location, while a portable device is in transit with a patient. Power to the monitoring equipment during transit is typically provided by batteries in the monitoring equipment. One skilled in the art will understand that batteries require charging, and that patients are in transit a small fraction of the time. Current portable monitoring equipment includes fixed docking stations in all appropriate fixed locations, such as operating rooms, examining rooms and patient rooms. When a patient is in one of these locations, the portable monitoring equipment is inserted into the docking station at that location. These docking stations are connected to the AC power at that location, and provide charging current for the batteries in the monitoring equipment. This permits the batteries to maintain their charge. When a patient is moved, the monitoring equipment, with a charged battery, is removed from the docking station, and transported with the patient until another docking station is available.

When the monitoring equipment is docked a wireless data link, e.g. radio frequency (RF), link typically transmits monitoring data from the monitoring equipment to the central location. Each piece of monitoring equipment includes an RF transceiver and antenna. Each docking station also includes a corresponding RF transceiver and antenna. In addition, free-standing antennas and transceivers are located throughout the hospital, in particular at locations where patients would be transported, e.g. halls, etc. Each of the transceivers in the docking stations and the free standing locations is connected by a wired connection to the central location. Using RF communications between the docking station and the monitoring equipment further provides electrical isolation.

When a patient is in a fixed location, and the monitoring equipment is placed in a docking station, the docking station receives the RF signal from the monitoring equipment and transmits the data to the central location via its wired connection. When a patient is in transit from one fixed location to another, the free standing antennas/transceiver locations receive the RF signal from the monitoring equipment and transmit the data to the central location. This provides the ability to monitor a patient continuously. However, there are locations in which continuous RF transmissions from the monitoring equipment may cause problems and must be carefully planned for. For example, in operating rooms, electro-cautery machines use RF energy to cut tissue and coagulate blood during surgery. This instrument causes an unpredictable amount of RF energy and could possibly interfere with the RF link of the monitoring equipment. However, it is in this environment that it is most important that no monitoring data be lost or corrupted.

A system according to the principles of the invention addresses the power coupling and data link problems previously discussed as well as derivative problems.

SUMMARY OF THE INVENTION

An electrically isolated combined power and signal coupler is usable for a portable medical monitoring device attachable to a patient in a medical environment. A power coupling system transfers power between a power source and a powered device separated by a physical and electrical isolation barrier. The system comprises a power coupler including in a first device, a first section of a magnetic circuit including a first core section of magnetically permeable material of cross-sectional area substantially larger at an isolation barrier interface than within a first winding located on the first core section. The first section of magnetic circuit being suitable, in a docking mode, for positioning adjacent to a second section of magnetic circuit in a second device to form a completed magnetic circuit used to transfer power between said first and second device. The second section of magnetic circuit including a second core section with a second winding magnetically coupling with the first winding via the completed magnetic circuit in the docking mode for the power transfer.

In a feature of the invention the first core section comprises at least one substantially planar core section at the isolation barrier interface for positioning adjacent to a corresponding substantially planar core section of said second section of magnetic circuit at the isolation barrier interface to form the completed magnetic circuit without a device containing the second section of magnetic circuit enveloping a significant portion of the substantially planar core section.

DETAILED DESCRIPTION OF THE INVENTION

Known systems transmit power across an interface between two separable elements comprising a power source and a device to be powered using a magnetic assembly comprising a traditional transformer core with a uniform magnetic cross sectional area. This may comprise, for example, two "C" cores placed in close proximity to one another to make a C—C transformer where the two gaps in the two legs of the C—C transformer are located at the interface between power source and the powered device, or alternatively may comprise two halves of a traditional "pot" core assembly where the mating surfaces of the halves are located at the interface. In either example, the gaps at the interface would be occupied by a plastic or other material comprising the enclosure or case of the power source and powered device, hereinafter referred to as "case material".

A major drawback of this approach is that a substantially constant magnetic cross sectional area of the cores results in a magnetic cross sectional area at the interface that is far smaller than is optimum. One problem is that mechanical considerations (e.g. in portable equipment) dictate a thickness of case material or enclosure that is greater than a desired gap thickness for a transformer design. Thus magnetic reluctance of such a magnetic gap is larger than necessary or desired, and is larger than the magnetic reluctance of the rest of the closed magnetic path typically comprised of a ferrite or other magnetically permeable material. Thus a transformer assembly has a magnetic reluctance higher than desired resulting in a corresponding magnetic inductance lower than desired. This causes an increased component of current flowing in the transformer windings known to those skilled in the art as "magnetizing current". This current does not result in useful transfer of power and causes additional power losses in the circuitry driving the transformer.

Figure 1:
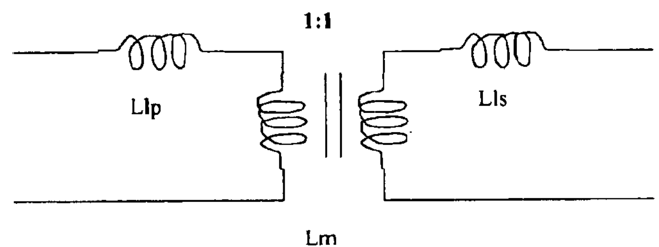
FIGS. 1 and 2 show simplified theoretical transformer component representations.
Figure 2:
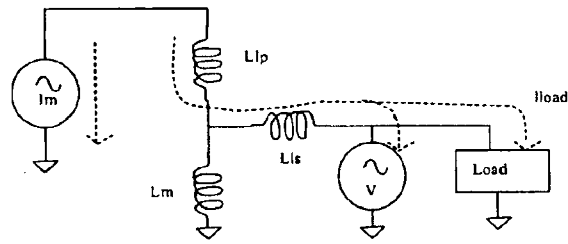

Furthermore, a gap larger than desired causes correspondingly larger amounts of leakage flux and this leakage flux does not couple between input and output transformer windings, but goes from one air gap laterally along the isolation barrier to the other gap. FIGS. 1 and 2 are simplified theoretical transformer component representations. As is known to those skilled in the art, a transformer may be modeled as an ideal transformer, as shown in FIG. 1, of mutual inductance Lm, ideal in the sense of having 100% coupling from primary to secondary, and two lumped inductors Llp and Lls in series with primary and secondary windings respectively, representing the leakage inductances due to magnetic flux that passes through either the primary or secondary winding but not both. FIG. 2 shows a simplified transformer idealized representation of the FIG. 1 model. Specifically FIG. 2 shows a 1:1 turns ratio model of the FIG. 1 transformer in which isolation is omitted and the primary and secondary connected together. Llp and Lm form an AC attenuator, so in the absence of any load current Iload, and no voltage drop across Lls, the output voltage is still less than the input voltage.

In a typical transformer, leakage inductances may be as little as 1% of the magnetizing, or mutual inductance Lm. Thus the attenuation of the input voltage is only 0.99. In such a transformer the use of a large isolation barrier gap may cause a significant problem since it may result in Llp being as great as Lm, or greater than Lm, so that input to output voltage attenuation is 0.5 or greater. Further, when load current Iload is drawn there is an additional voltage drop across Lls and an increased drop across Llp. This also limits available transformer power output. In addition, the magnetizing current in Lm contributes nothing to power transfer from input to output, but causes resistive losses in the winding and driving circuitry. This problem is not significantly ameliorated by changing the number of winding turns since this increases or decreases Llp and Lm together which does not significantly reduce voltage attenuation and inefficiency in primary to secondary winding coupling.

Figure 3:
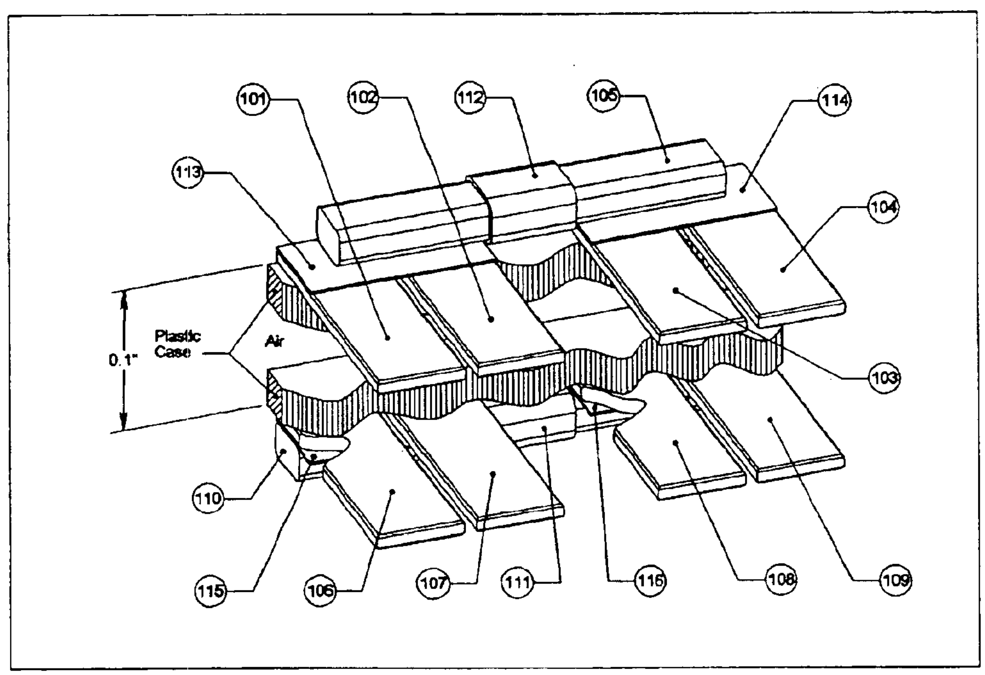
FIG. 3 shows a transformer for transferring power between a power source and a powered device that includes an isolation barrier and comprises on either side of the barrier, a magnetic core assembly with a nonuniform core cross-section, according to invention principles.

FIG. 3 shows a transformer for transferring power between a power source and a powered device that includes an isolation barrier and comprises on either side of the barrier, a magnetic core assembly with a nonuniform core cross-section. The coupling arrangement of FIG. 3 advantageously reduces magnetizing current (Lm) as well as the ratio of leakage inductance to magnetizing inductance (Llp and Lls to Lm) and increases power transfer from input to output. This is achieved by increasing the magnetic inductance of the transformer assembly and by changing the design of the magnetic path in the transformer assembly to have a substantially non-uniform magnetic core cross sectional area. The core cross sectional area in the FIG. 3 arrangement is made larger in the vicinity of the barrier interface between power source and powered device, and smaller in the vicinity of the winding.

The FIG. 3 coupling arrangement advantageously exhibits a substantially larger core cross-sectional area at the barrier interface than at the primary and secondary windings. This reduces the magnetic reluctance of the gap (which is inversely proportional to the area of the gap and proportional to the length of the gap). The smaller area at the winding reduces the circumference of the core, thus reducing the length and resistance of the winding, which reduces resistive power losses from the current in the winding. A further advantage is reduction in overall size, weight and volume of the cores, and thus core power losses that are proportional to the magnetic field strength and the volume of the core. If the magnetic core cross sectional area at the interface were maintained through the magnetic path length (as in known prior art arrangements) the cores and overall assembly would be substantially larger in volume and weight than the core arrangement of FIG. 3.

Known planar transformer configurations are characterized by being flat and wide to reduce the height dimension, but these transformers typically maintain a substantially uniform magnetic cross sectional area throughout the length of the magnetic path (usually with a small or negligible air gap in the magnetic path). Other known systems have used a transformer coupling interface between the two separable devices comprising a protruding section on one device that is shaped as a solid or hollow cylinder or flat paddle, for example and a corresponding opening in the other device. Problems with this approach include resulting surface inaccessibility, making the coupling arrangement difficult to maintain and clean and vulnerability to collection of interfering foreign matter. Also, careful alignment of protrusion with opening is necessary to mate the two devices. In addition, known enclosed configurations, involving inserting a part (e.g., a cylindrical or paddle shaped part) into an opening, have reduced capability for heat dissipation. An inserted part is typically largely enveloped by an enclosure and surrounded by the walls of the opening. Such enclosure configurations impede heat transfer and lead to heat build-up and higher temperatures in the inserted part.

In contrast the FIG. 3 system exhibits a substantially flat, planar interface between two separable devices (e.g., a portable device and its docking station). This allows the arrangement to be used in a wide variety of systems including, for example, applications where geometry of two mating devices lends itself to planar configuration, such as telephone handsets and their cradles, small handheld computers or other devices and a docking station, or any other application where one device typically has a large planar area. A further advantage of the planar interface coupling arrangement of FIG. 3 is that it comports with typical mechanical design requirements of target host devices and minimizes any required mechanical reconfiguration. The coupling arrangement also provides improved heat dissipation.

In the FIG. 3 system, the magnetic path exhibits a relatively large cross-sectional area at the air gap and isolation interface in comparison to the cross-sectional area at the windings (111 and 112). The magnetic flux is conducted through a relatively small cross sectional area via crossbar 105 to complete the magnetic path. Ferrite is typically the preferred magnetic material for magnetic cores for applications of 20 kHz or above and core dimensions in the range up to 5 to 10 cm. However, the inventive principles apply to other types and sizes of magnetically permeable core material as well. Other magnetically permeable materials include composite materials, for example, or powdered iron or silicon steel laminations typically used at lower frequencies or where size dictates ferrite is too expensive or too brittle or has other limitations. A magnetic core is usually divided into separate pieces for ease of fabrication and to prevent fracturing at the junctions of the separate slabs however, a core may also be molded of one piece of ferrite with due consideration to the mechanical stresses. A core that is divided into separate pieces may include a pliable ferrous material between the sections of magnetic material to join and cushion them to prevent fracturing from shock or vibration. Suitable material made of a mixture of ferrite particles and polymer is commercially available with permeability values relative to vacuum of 10 to 25, for example.

The FIG. 3 arrangement involves a portable device section (elements 101–105, and 112–114 corresponding to core section 322 of FIGS. 4–6 discussed later) mating to form a transformer coupled magnetic circuit with a docking device section (elements 106–111, and 115, 116 corresponding to core section 344 of FIGS. 4–6) via a plastic case (and air gap) when the portable device is docked for re-charging. The portable device section includes a C core type arrangement made from ferrite slabs 101–104 and crossbar 105. The docking device includes a corresponding mating C core made from ferrite slabs 106–109 and crossbar 110. Input AC voltage is applied to a winding coil 111 of the docking station and transformed output voltage is derived from portable device winding coil 112. Upon placing the portable device in the docking station, portable device ferrite slabs 101–104 are positioned within 1 tenth of an inch of corresponding docking station slabs 106–109 respectively. This tenth of an inch space is filled by plastic cases of the portable device and docking station and an air gap. Magnetically permeable pads 113 and 114 are used to couple the bar 105 to slabs 101–104 and provide some shock resistance for the device. Similarly, magnetically permeable pads 115 and 116 are used between crossbar 110 and slabs 106–109.

Figure 4:
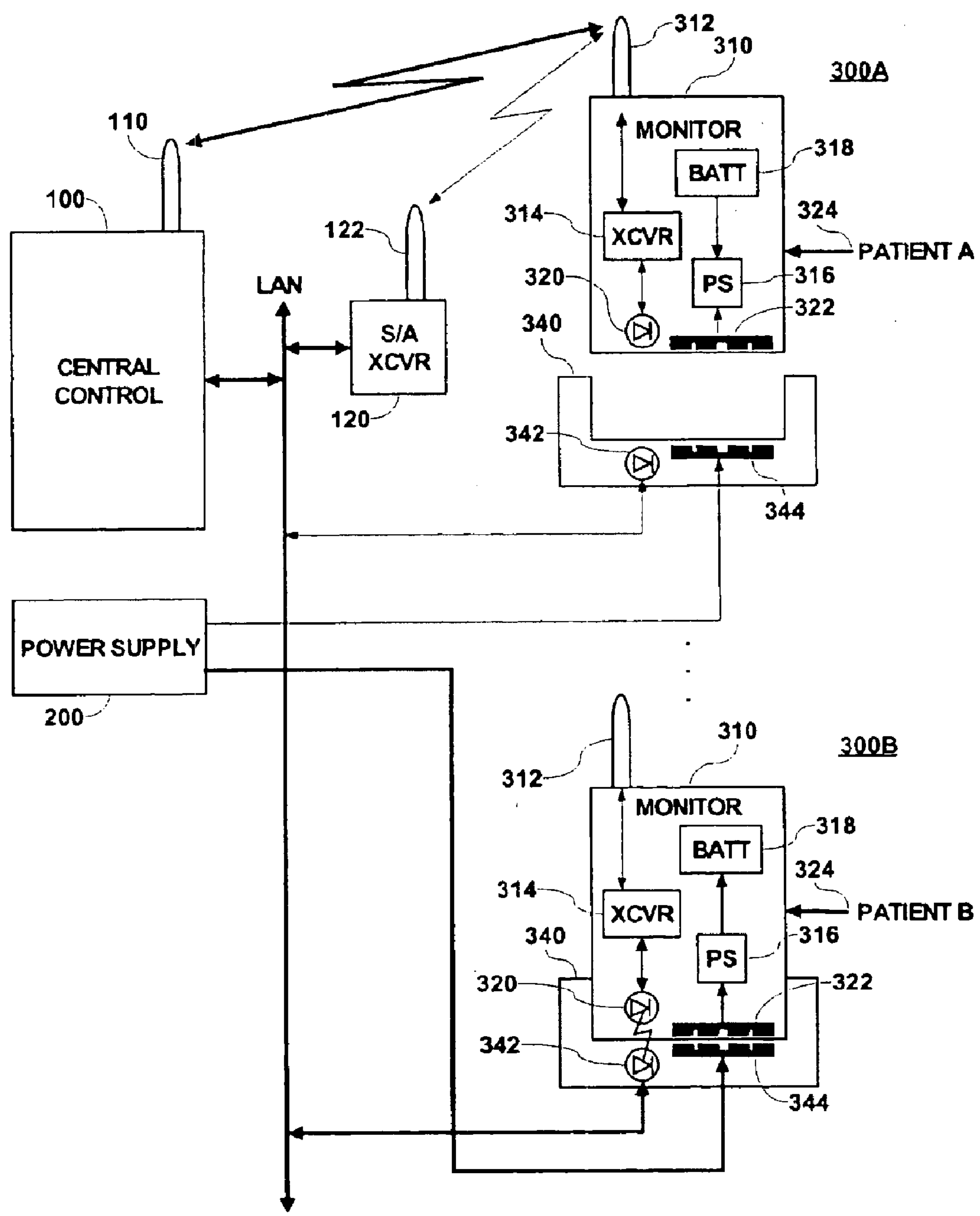
FIG. 4 is a block diagram of a monitoring system including a central location, docking stations and portable monitoring devices, according to invention principles.
Figure 5:
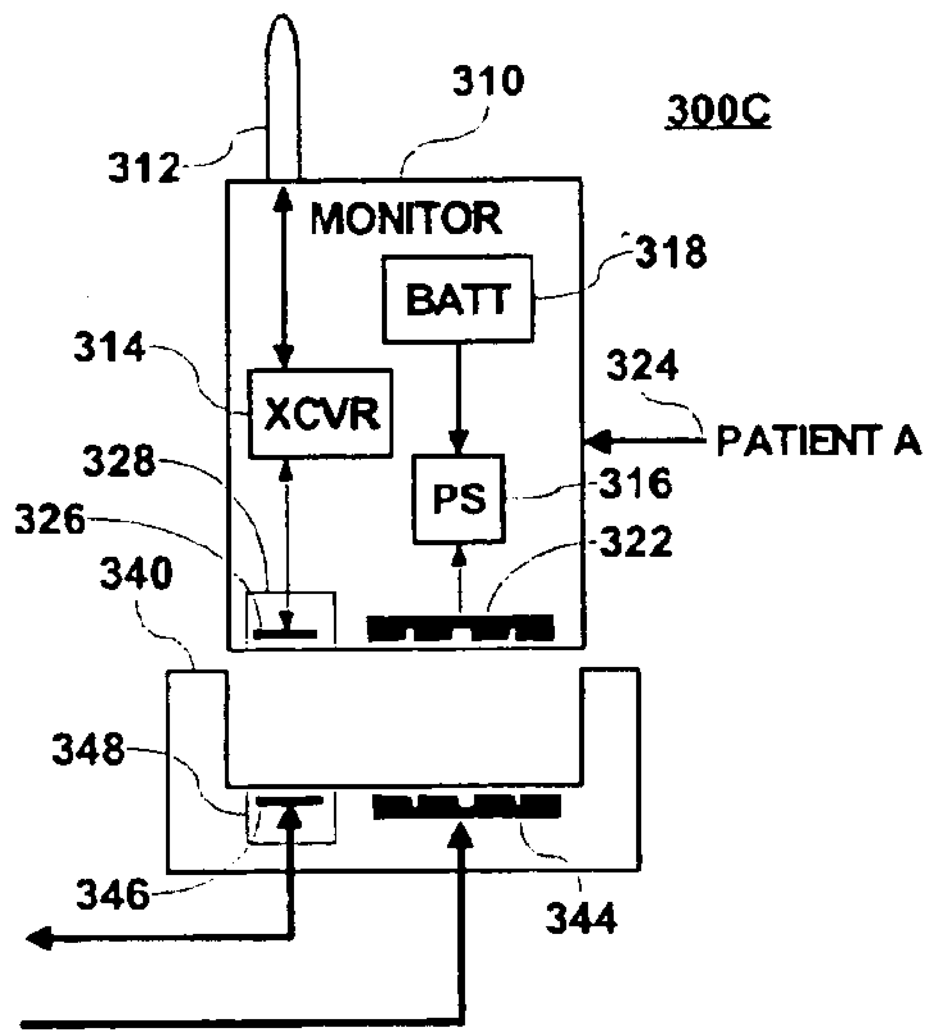
FIGS. 5 and 6 are block diagrams of a monitoring device illustrating an arrangement for using alternative transmission media and is illustrating power and data transmission apparatus for a monitoring system as illustrated in FIG. 4, according to invention principles.

FIG. 4 is a block diagram of a monitoring system including a central location, docking stations and portable monitoring devices. FIG. 4 illustrates a plurality (300A and 300B) of portable monitoring devices 310 and docking stations 340 each coupled to a central controller 100 and central power supply 200. Each monitoring device 310 includes electrodes 324 intended to be attached to a patient (PATIENT A and PATIENT B).

Each portable monitoring device 310 includes an RF antenna 312. A bidirectional terminal of the RF antenna 312 is coupled to a corresponding terminal of a transceiver 314. The transceiver 314 is coupled (not shown) to other circuitry (also not shown) in the monitoring device 310. Each portable monitoring device 310 also includes a battery 318. The battery 318 is coupled to a power supply 316. The power supply 316 is also coupled (not shown) to the other circuitry in the monitor 310, all in a known manner. The design, operation and interconnections of the other circuitry discussed above is well known to one skilled in the art, is not germane to the present invention and will not be described in detail below.

An optical transducer 320 in the illustrated embodiment represents a wireless two-way full duplex optical transducer. One skilled in the art will understand that this transducer may include a light emitting diode (LED) for transmitting and a photo-transistor for simultaneously receiving optical signals. A bidirectional terminal of the optical transducer 320 is coupled to a corresponding terminal of the transceiver

314. Data terminals (not shown) of the transceiver 314 are connected to other circuitry (also not shown) in the monitoring device 310. The monitoring device 310 also includes a secondary 322 of a split transformer as previously described in connection with FIG. 3. The secondary 322 is coupled to an input terminal of the power supply 316.

Each docking station 340 includes an optical transducer 342 representing a wireless two-way full duplex optical transducer. The optical transducer 342 corresponds to the optical transducer 320 in the monitoring device 310, and is arranged physically so that full duplex communication may be carried on between the corresponding optical transducers 320 and 342 when the monitoring device 310 is docked in the docking station 340.

The docking station 340 also includes a primary 344 of the split transformer. The primary 344 corresponds to the secondary 322 of the split transformer in the monitoring device 310, and is arranged so that a complete transformer is formed, and electrical power transferred, when the monitoring device 310 is docked in the docking station 340.

In operation, when portable device 310 (FIG. 4) is docked in the docking station 340, an alternating current is supplied from the power supply 200 to the primary windings 111 (FIG. 3). This alternating current induces a magnetic field within the core comprising the magnetic circuit involving the docking station and portable device core sections. A secondary current is thereby induced in the secondary winding (112) in the portable device 310 (FIG. 4). This secondary current is supplied to the power supply 316 to power the portable device 310 and recharge the battery 318. Simultaneously, the alignment of the photo devices 320 and 342 provide full duplex data communication between the monitoring device 310 and docking station 340. A compact, efficient configuration can be realized using these principles.

FIG. 4, also illustrates a central controller 100. The central controller 100 includes a bidirectional data terminal coupled to a local area network (LAN). This LAN connects with various workstations (not shown) within the hospital and also may include a bridge (also not shown) to a wide area network (WAN) such as, for example, the internet. The optical transducers 342 in the plurality 340 of docking stations are bidirectionally coupled to the LAN. Although the optical transducers 342 are illustrated as being coupled to the central controller 100 via the LAN, one skilled in the art will understand that respective bidirectional signal lines may be coupled directly between the optical transducers 342 in each of the plurality of docking stations 340 and corresponding bidirectional terminals on the central controller 100. These respective signal lines may then be used to communicate directly between docking stations 340 and the central controller 100.

The central controller 100 also includes an RF antenna 110. This RF antenna 110 is capable of communicating with the respective RF antennas 312 of the monitoring devices 310 via radio transmission in a known manner. Although illustrated as a single antenna 110, one skilled in the art will understand that multiple antennas, distributed throughout the hospital, may all be connected to the central controller 100. For example, a standalone transceiver 120 is coupled to the LAN. The standalone transceiver 120 includes an RF antenna 122 capable of exchanging data with the portable devices 310, as illustrated in phantom in FIG. 4. As described above, these standalone transceivers may also be connected to the central controller 100 via respective direct connections. Such standalone transceivers may be placed throughout the hospital for communicating with the portable monitoring devices 310 while undocked and in transit.

A power supply 200 is coupled to the respective primaries 344 in the plurality of base stations 340. Although illustrated as a separate element in FIG. 4, the standard distributed AC power system may be used for providing power to the plurality of primaries 344 in the plurality of base stations 340.

In operation, the monitoring devices 310 operate in one of two states: docked or undocked. The monitoring device 310 and docking station 340 pair in the upper part of the FIG. 4, 300A, are in the undocked condition, and the monitoring device 310 and docking station 340 pair in the lower part of the FIG. 4, 300B, are in the docked condition. In general, when a monitoring device 310 is docked, data communications takes place through the optical transducers 320,342 and power is supplied to the monitoring device 310 through the split transformer 344, 322. When a monitoring device is undocked, data communications takes place through the RF antenna 312 and power is supplied from the battery 318.

In 300A (undocked), the connection between the optical transducer 320 and the transceiver 314 is illustrated in phantom to indicate that it is currently inoperative, while the connection between the antenna 312 and the transceiver 314 is indicated by a solid line to indicate it is operating. The zigged line between the antenna 110 on the central controller 100 and the antenna 312 on the monitoring device 310 illustrates that an RF link is being maintained between the monitoring device 310 and the central controller 100. Similarly, the connection between the secondary 322 of the split transformer and the power supply 316 is illustrated in phantom to indicate that it is currently inoperative, while the connection between the battery 318 and the power supply 316 is indicated by a solid line with an arrow to indicate that power is being transferred from the battery 318 to the power supply 316. The data connection between the optical transducer 342 in the docking station 340 and the LAN, and the power connection between the power supply 200 and the primary 344 of the split transformer are illustrated in phantom to illustrate that they are currently inoperative.

In 300B (docked), the connection between the antenna 312 and the transceiver 314 is illustrated in phantom to indicate that it is currently inoperative, while the connection between the optical transducer 320 and the transceiver 314 is indicated by a solid line to indicate it is operating. The zigged line between the optical transducer 342 in the docking station 340 and the optical transducer 320 in the monitoring device 310 illustrates that an optical link is being maintained between the monitoring device 310 and the central controller 100. Similarly, the connection between the secondary 322 of the split transformer and the power supply 316 is illustrated by a solid line to indicate that it is currently operating. The connection between the battery 318 and the power supply 316 is indicated by a solid line with an arrow to indicate that charging power is being transferred from the power supply 316 to the battery 318. The connections between the LAN and the optical transducer 342 in the docking station 340 and between the power supply 200 and the primary 344 of the split transformer are illustrated as solid lines to indicate they are operative. There is no zigged line between the antenna 312 of the monitoring device 310 and the antenna 110 of the central controller 100 which indicates that there is no RF communications taking place.

One skilled in the art will understand that the central controller 100 will be in communication with many monitoring devices 310 simultaneously, through the LAN and/or through respective hardwired connections (not shown) to docking stations 340 in which the monitoring devices 310 are docked, and/or through wireless RF links to undocked monitoring devices 310. Any of the known techniques for carrying on simultaneous communications, such as time division multiplexing, frequency division multiplexing, packetized communication, or any combination of such techniques may be used to provide this simultaneous communications. For example, various protocols are in general usage for network communications among a plurality of network nodes. More specifically, such protocols include, among many others: internet protocol (IP), universal serial bus (USB), I.E.E.E. network protocol. Any of these known protocols may be used to communicate between the plurality of monitoring devices 310 and the central controller 100 via the LAN. These same protocols may be also used for wireless RF communications between undocked monitoring devices 310 and the antenna 110 of the central controller 100, directly or through standalone transceivers 120 connected to the central controller 100 via the LAN or through respective hardwired connections.

Known circuitry in the monitoring device 310 and the docking station 340 detects when the monitoring device 310 is docked with the docking station 340. In one embodiment, because electrical power is transferred only when the monitoring device 310 is docked with the docking station 340, such circuitry in the docking station 340 may detect a load (secondary 322) attached to the primary 344 and corresponding circuitry in the monitoring device 310 may detect the presence of power at the secondary 322. For another example, because data will be exchanged via the optical transducer pair 320,342 only when the monitoring device 310 is docked with the docking station 340, such circuitry in the docking station 310 may detect the presence of data from the optical transducer 320 and corresponding circuitry in the docking station 340 may detect the presence of data from the optical transducer 342.

When the docking station 340 detects that a monitoring device 310 is docked, the central controller 100 begins communicating through the LAN with the optical transducer 342 in the docking station 340. Simultaneously, when the monitoring device 310 detects that it has been docked, the transceiver 314 is connected to the optical transducer 320, and communications is initiated via the optical transducer pair 320,342 through the LAN, with the central controller 100. More specifically, the transceiver 314 in the monitoring device 310 generates data in the network protocol used by the LAN, i.e. IP packets. The packetized data is then passed through the optical transducer pair 320,342 to the LAN. The central controller 100, in turn, receives the IP packets from the LAN and extracts the data. This data is then processed by the central controller 100. For example, patient monitoring data is stored in the central location. Concurrently, data from the central controller 100 meant for the monitoring device 310 is packetized and placed on the LAN. The packetized data is received by the monitoring device 310 via the optical transducer pair 342,320. The transceiver 314 extracts the data and controls the operation of the monitoring device 310 in the manner specified by the received data. For example, monitoring parameters may be set or changed by the central controller 100. At the same time, when it is detected that the monitoring device 310 is docked in the docking station 340, power from the secondary 322 of the split transformer powers the circuitry in the monitoring device 310, including charging the battery 318.

When the docking station 340 detects that a monitoring device 310 has been undocked, the central controller 100 is notified and it begins communicating through the RF antenna 110. Concurrently, when the monitoring device 310 detects that it has been undocked, the transceiver 314 is connected to the RF antenna 312, and communications is initiated via the RF link to the central controller 100. As described above, the transceiver 314 generates the data in the selected network protocol, i.e. IP packets. This packetized data is transmitted to the central controller 100 via the wireless RF antenna 110. The central controller 100 receives the IP packets, extracts the data and processes the data, e.g. stores the patient monitoring data. The central controller 100 may also generate IP packets of data meant for the monitoring device 310. The central controller 100 transmits this packetized data to the antenna 312 of the monitoring device 310 via the wireless RF antenna 110. The transceiver 314 in the monitoring device 310, in turn, receives the IP packets, extracts the data and controls the operation of the monitoring device 310 in response.

Alternatively, the standalone transceiver 120 may communicate via a wireless RF signal with the monitoring device 310. In this case, the antenna 312 of the monitoring device 310 transmits the packetized patient monitoring data to the antenna 122 of the standalone transceiver 120, as described above. The standalone transceiver 120 receives this packetized data and places it on the LAN. The central controller 100 receives the IP packets from the LAN, extracts the data and processes it in the desired manner. The central controller 100, in turn, places packetized data meant for the monitoring device 310 on the LAN. The standalone transceiver 120 receives the packetized data and transmits it to the antenna 312 of the monitoring device 310. The transceiver 314 in the monitoring device 310 receives the packets, extracts the data from the received packets and controls the operation of the monitoring device in response. In addition, power from the battery 318 powers the circuitry in the monitoring device 310 when the monitoring device is undocked.

In the embodiment illustrated in FIG. 4 and described above, the transmission medium changes from when the monitoring device 310 is docked (optical) to when it is undocked (RF). However, one skilled in the art will understand that it is possible to share the same transmission medium in both modes. FIG. 5 illustrates a monitoring device 310 with an alternate means for communicating with the central controller 100 when docked. In FIG. 5, the transceiver 314 in the monitoring device 310 is coupled to an RE antenna 326 physically arranged to be adjacent to the docking station 340 when it is docked. The docking station 340 includes a corresponding RF antenna 346 physically arranged to be adjacent the RF antenna 326 in the monitoring device 310 when it is docked. These antennas 326 and 346 may be small and are arranged to be close to each other. A shield 328, illustrated by a dotted line, in the monitoring device 310 surrounds the antenna 326, and a corresponding shield 348 in the docking station 340 surrounds the antenna 346. The shields 328 and 348 are physically arranged to cooperate when the monitoring device 310 is docked in the docking station 340 to completely shield the antennas 326 and 346 so that they do not radiate to the surrounding area, and so that RF interference in the surrounding area, such as may be generated by surgical equipment, does not produce interference in the communication between them.

In this manner, the central controller 110 may use a common RF transceiver for both docked and undocked monitoring devices 310. When docked, the RF antenna pair 326 and 346 are used, and when undocked, the RF antenna pair 110 and 312 are used. One skilled in the art will understand that the signal level from an RF antenna 346 in a docking station 340 will be stronger than that from the broadcast antenna 110. One skilled in the art will understand that attenuators and/or amplifiers may be necessary to enable use of an RF transceiver with normal dynamic range in the central controller 100.

Figure 6:
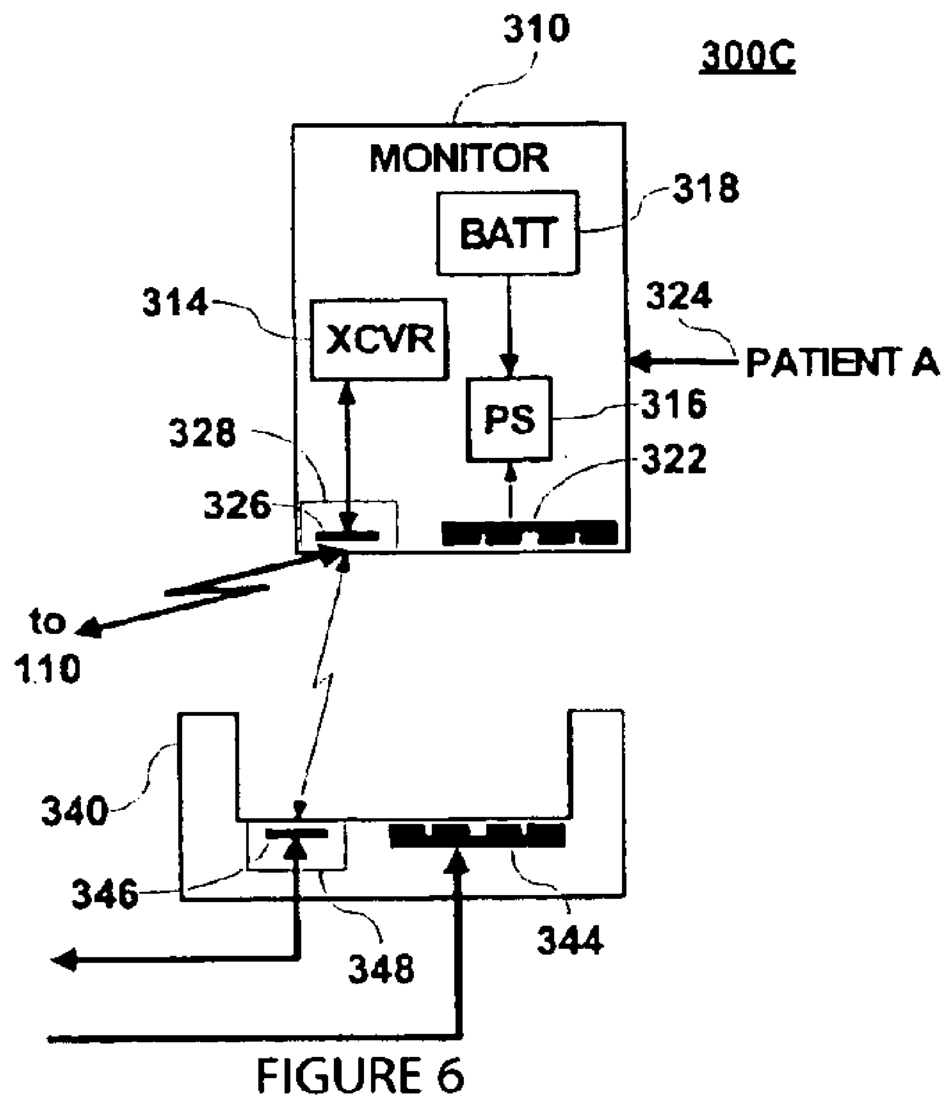

FIG. 6 illustrates a monitoring device 310 with another alternate means for communicating with the central controller 100 when docked and undocked. In FIG. 6, the monitoring device 310 does not include an antenna 312 as in FIG. 4 and FIG. 5. Instead, in FIG. 6, the embedded antenna 326 operates as the RF antenna both when the monitoring device 310 is docked, as in FIG. 4, and also when the monitoring device 310 is undocked, as illustrated by the thick zigged line in FIG. 6. As in FIG. 5, when the monitoring device 310 is docked, the shields 326 and 346 cooperate to completely shield the antennas 326 and 346 from the surrounding area. However, in FIG. 6, when the monitoring device 310 is undocked, the shields 328 and 348 part and the antenna 326 is able to transmit to the surrounding area. That is, the antenna 326 is able to transmit to the antenna 110 on the central location or any of the plurality of free standing antennas in the hospital, as described above. Furthermore, the antenna 346 in the docking station 340 is able to act as one of the standalone antennas (such as 122—FIG. 4) receiving RF signals from the antenna 326 in the monitoring device 310. Therefore, the antenna 326 in the monitoring device 310 is able to communication with the antenna 346 in the docking station 340 even when it is undocked. This is illustrated in FIG. 6 by a thin zigged line.

One skilled in the art will understand that additional reliability may be obtained by using redundant transmission media. For example, a monitoring device 310 and docking station 340 may include both optical transducers 320 and 342, as illustrated in FIG. 4, and also RF antennae 326 and 346 as illustrated in FIG. 5 and FIG. 6. In operation, both media are used to transmit data between the monitoring device 310 and the docking station 340 concurrently.

The optical transducer 342 in the docking station 340 comprises an optical transmitter, in the form of a light emitting diode (LED) and an optical receiver, in the form of a photo-transistor. The optical transducer 320 in the monitoring device 310 also includes an optical transmitter in the form of an LED and an optical receiver in the form of a photo-transistor. These LEDs and photo-transistors operate in a known manner in response to electrical signals provided to them. The LED in the docking station is physically arranged so that its light emissions are received only by the photo-transistor in the monitoring device 310, and the LED in the monitoring device 310 is physically arranged so that its light emissions are received only by the photo-transistor in the docking station 340 when the monitoring device 310 is docked in the docking station 340. The use of optical transducers 320,342 eliminates adverse effects due to surrounding RF fields, such as might occur in an operating room, as described above.

As described with reference to FIG. 4, the LEDs and photo-transistors may be replaced or augmented with a small RF antenna, possibly in the form of a strip line, shielded in a known manner. The use of an RF link simplifies the circuitry required in the central location 100 because it needs only a single RF transceiver rather than an RF transceiver and an optical transceiver. With proper shielding, adverse effects of interfering RF signals may be minimized.

What is claimed is:

1. A power coupling system for transferring power between a power source and a powered device separated by a physical and electrical isolation barrier, comprising:

a power coupler including in a first device, a first section of a magnetic circuit including a first core section of magnetically permeable material of cross-sectional area substantially larger at an isolation barrier interface than within a first winding located on said first core section, said first section of magnetic circuit being suitable, in a docking mode, for positioning adjacent to a second section of magnetic circuit in a second device to form a completed magnetic circuit used to transfer power between said first and second device, said second section of magnetic circuit including a second core section with a second winding magnetically coupling with said first winding via said completed magnetic circuit in said docking mode for said power transfer.

2. A system according to claim 1, wherein said first core section comprises at least one substantially planar core section at said isolation barrier interface for positioning adjacent to a corresponding substantially planar core section of said second section of magnetic circuit at said isolation barrier interface to form said completed magnetic circuit.

3. A system according to claim 2, wherein said substantially planar core section is suitable for positioning adjacent to said corresponding substantially planar core section without a device containing said second section of magnetic circuit enveloping a significant portion of said substantially planar core section.

4. A system according to claim 1, wherein said second section of said magnetic circuit includes a second core section of magnetically permeable material of cross-sectional area substantially larger at said isolation barrier interface than within a second winding located on said second core section.

5. A system according to claim 1, wherein said first and second devices are, (a) a portable device and (b) a docking station for said portable device, respectively.

6. A system according to claim 1, wherein said first core section of magnetically permeable material comprises a plurality of component core pieces and including pliable ferrous material placed between at least one junction of said core pieces.

7. A system according to claim 1, wherein a physical interface between said first section of magnetic circuit and said second section of magnetic circuit, is substantially planar.

8. A system according to claim 1, wherein said cross-sectional area substantially larger at said isolation barrier interface than within said first winding comprises being at least one and a half times (1.5 times) larger.

9. A system according to claim 1, wherein said magnetically permeable material comprises at least one of, (a) a ferrite material, (b) a composite material, (c) powdered iron, (d) silicon steel laminations and (e) an amorphous magnetic material.

10. A system according to claim 1, wherein said physical and electrical isolation barrier is at least 0.01 inches.

11. A portable device for transferring power and data between a power source and a powered device separated by a physical and electrical isolation barrier, comprising:

a power coupler including in a first device, a first section of a magnetic circuit including a first core section of magnetically permeable material of cross-sectional area substantially larger at an isolation barrier interface than within a first winding located on said first core section, said first section of magnetic circuit being suitable, in a docking mode, for positioning adjacent to a second section of magnetic circuit in a second device to form a completed magnetic circuit used to transfer power between said first and second device, said second section of magnetic circuit including a second core section with a second winding magnetically coupling with said first winding via said completed magnetic circuit in said docking mode for said power transfer; and an electrically isolated data transducer supporting connection of said first device to a network and to bidirectionally exchange data in said docking mode.

12. A portable device according to claim 11 wherein, said portable device comprises a portable patient monitoring device, and said bidirectionally exchanged data includes patient monitor parameters derived by said portable patient monitoring device and information for controlling a function of said portable patient monitoring device.

13. A portable device according to claim 11 wherein, said network connection of said portable device comprises at least one of, (a) an Internet Protocol (IP) compatible connection, (b) a Universal Serial Bus (USB) compatible connection, (c) a Local Area Network (LAN compatible connection and (d) an I.E.E.E. protocol compatible connection.

* * * * *